US012683694B2

(12) United States Patent
Chen et al.

(10) Patent No.: US 12,683,694 B2
(45) **Date of Patent: \*Jul. 14, 2026**

(54) GATING APPARATUS FOR SINGLE-PHOTON DETECTOR AND QUANTUM COMMUNICATION DEVICE

(71) Applicant: QUDOOR TECHNOLOGIES INC., Beijing (CN)

(72) Inventors: Liuping Chen, Beijing (CN); Yongsheng Fan, Beijing (CN); Xiangkui Wan, Beijing (CN); Zhenyang Jin, Beijing (CN); Qibing Wang, Beijing (CN); Xihui Yang, Beijing (CN)

(73) Assignee: QUDOOR TECHNOLOGIES INC., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/682,915

(22) PCT Filed: Aug. 12, 2022

(86) PCT No.: PCT/CN2022/111946
§ 371 (c)(1),
(2) Date: Feb. 11, 2024

(87) PCT Pub. No.: WO2023/016533
PCT Pub. Date: Feb. 16, 2023

(65) Prior Publication Data
US 2024/0372630 A1 Nov. 7, 2024

(30) Foreign Application Priority Data
Aug. 12, 2021 (CN) .......................... 202110921944.2

(51) Int. Cl.
*H04B 10/70* (2013.01)

(52) U.S. Cl.
CPC .................................... *H04B 10/70* (2013.01)

(58) Field of Classification Search
CPC ...................................................... H04B 10/70
(Continued)

(56) References Cited

U.S. PATENT DOCUMENTS

2004/0233935 A1* 11/2004 Yuan ..................... H04L 9/0858
370/474
2006/0198463 A1* 9/2006 Godin ................... H03M 5/145
(Continued)

FOREIGN PATENT DOCUMENTS

CN 102735351 A 10/2012
CN 106197692 A 12/2016
(Continued)

OTHER PUBLICATIONS

English translation of CN-110752882-A, Clarivate Analytics, pp. 1-9 (Year: 2020).*
(Continued)

*Primary Examiner* — David P Zarka
(74) *Attorney, Agent, or Firm* — The Sun IP Law

(57) ABSTRACT
The gating apparatus comprises: a system synchronization unit configured to acquire a clock of a quantum communication system; and a programmable controller configured to generate at least one periodic gating signal sequence that are synchronized with the clock of the quantum communication system, wherein gating signals in each gating signal sequence are spaced apart from each other by a predetermined duration, such that a single-photon detector can operate in a corresponding Geiger mode for a received optical pulse, and the predetermined duration is an optical path difference between a long arm and a short arm of an unequal-arm interferometer that is used for performing phase encoding in the quantum communication system.

7 Claims, 5 Drawing Sheets

(58) Field of Classification Search
USPC ........................................................ 380/255
See application file for complete search history.

(56) References Cited

U.S. PATENT DOCUMENTS

| | | | |
|---|---|---|---|
| 2009/0196419 A1 | 8/2009 | Tapster | |
| 2016/0047643 A1* | 2/2016 | Yuan ..................... H01S 5/4006<br>398/25 | |
| 2024/0297722 A1* | 9/2024 | Chen ......................... G01J 1/44 | |

FOREIGN PATENT DOCUMENTS

| CN | 106768320 A | | 5/2017 | | |
|---|---|---|---|---|---|
| CN | 107036722 A | | 8/2017 | | |
| CN | 110120835 A | | 8/2019 | | |
| CN | 110752882 A | * | 2/2020 | .......... | H04L 9/0858 |
| CN | 111504482 A | * | 8/2020 | .............. | G01J 11/00 |
| CN | 113037391 A | * | 6/2021 | ......... | H04B 10/6911 |
| CN | 213902667 U | | 8/2021 | | |
| CN | 113708846 A | | 11/2021 | | |

OTHER PUBLICATIONS

English translation of CN-111504482-A, Clarivate Analytics, pp. 1-12 (Year: 2020).*

A Voltage Pulse Generator for Measurement-Device-Independent Quantum Key Distribution, IEEE Transactions on Nuclear Science, vol. 66, No. 7, pp. 1100-1106 (2019) (Year: 2019).*

Al, Qing, "Performance analysis of single-photon detectors based on APD gate mode", Technology and Market, Feb. 28, 2007, pp. 35-37.

The First Search Report for CN application No. 202110921945.7 issued on Mar. 25, 2022.

The Supplemental Search Report for CN application No. 202110921945.7 issued on Apr. 11, 2022.

\* cited by examiner

Fig. 1A
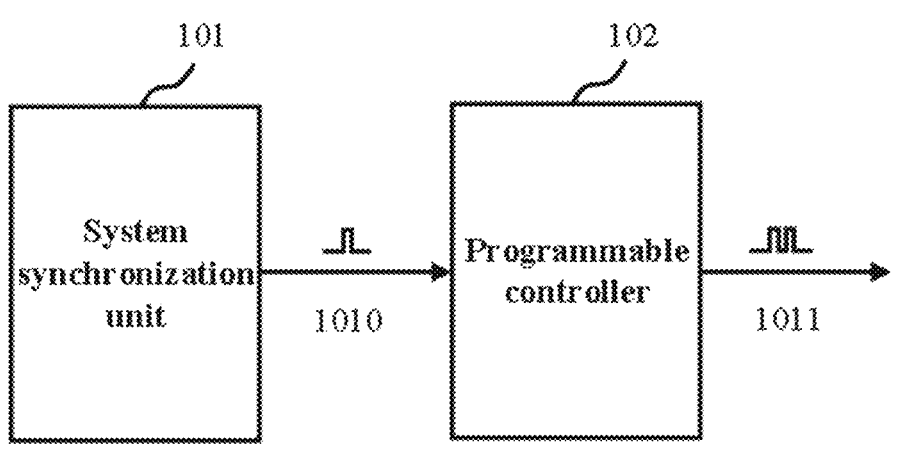
Fig. 1B
Fig. 2
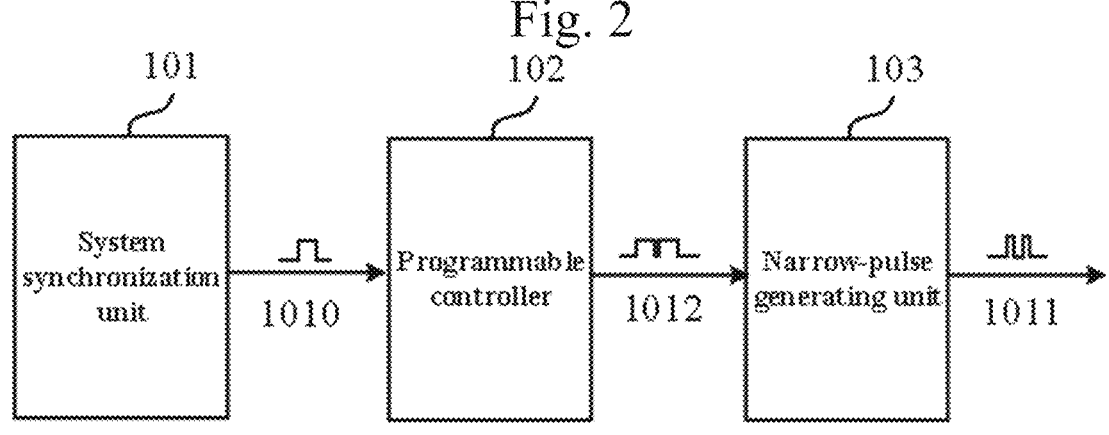

Gating signal applied to $D_2$

1000

Optical pulse

1011

GATING APPARATUS FOR SINGLE-PHOTON DETECTOR AND QUANTUM COMMUNICATION DEVICE

TECHNICAL FIELD

The present disclosure relates to the technical field of quantum communications, in particular, to a gating apparatus for a single-photon detector and a quantum communication device.

BACKGROUND

At present, in a quantum communication system, periodic gating signals as shown in FIG. 5B are mainly applied to a single-photon detector to turn on the gating of the single-photon detector, so as to detect optical pulses transmitted in the quantum communication system. However, the use of single periodic gating signals at a high repetition frequency may increase the dark count and the after-pulse count in the single-photon detector, which may lead to an increase in the error rate of the quantum communication system during the coding process, thereby reducing the final key rate of the quantum communication system.

SUMMARY

In order to solve the described problem, the present disclosure provides a gating apparatus for a single-photon detector and a quantum communication device.

According to one aspect of the present disclosure, provided is a gating apparatus for a single-photon detector. The gating apparatus comprises: a system synchronization unit configured to acquire a clock of a quantum communication system; and a programmable controller configured to generate at least one periodic gating signal sequence that are synchronized with the clock of the quantum communication system, wherein gating signals in each gating signal sequence are spaced apart from each other by a predetermined duration, such that a single-photon detector can operate in a corresponding Geiger mode for a received optical pulse, so that a single-photon detector in the quantum communication system turns on gating of the single-photon detector with regard to a received optical pulse, wherein the predetermined duration is an optical path difference between a long arm and a short arm of an unequal-arm interferometer that is used for performing phase encoding in the quantum communication system.

According to another aspect of the present disclosure, a quantum communication device is provided. The quantum communication device comprises the gating apparatus for the single-photon detector as described above.

The gating apparatus for the single-photon detector and the quantum communication device provided in the present disclosure can effectively reduce dark count and after-pulse count caused by the use of periodic gated signals at a high repetition frequency during the operation of the single-photon detector in quantum communication system at a high frequency, thereby greatly reducing the error rate of quantum communication system during the coding process to a great extent. In addition, the gating apparatus for the single-photon detector and the quantum communication device provided in the present disclosure can also significantly reduce the number of single-photon detectors and polarization beam splitters which are used in a quantum communication system, so that not only the implementation cost of the system can be greatly reduced, but also the insertion loss caused by using an additional polarization beam splitter can be avoided.

BRIEF DESCRIPTION OF THE DRAWINGS

The above objects and features of the present disclosure will become clearer from the following description in conjunction with accompanying drawings.

FIG. 1A is a schematic diagram of a gating apparatus for a single-photon detector according to an illustrative example of the present disclosure.

FIG. 1B is a signal timing schematic diagram of an operation process of a gating apparatus for a single-photon detector according to an illustrative example of the present disclosure.

FIG. 2 is another schematic diagram of a gating apparatus for a single-photon detector according to an illustrative example of the present disclosure.

DETAILED DESCRIPTION OF THE EMBODIMENTS

Figure 3A:
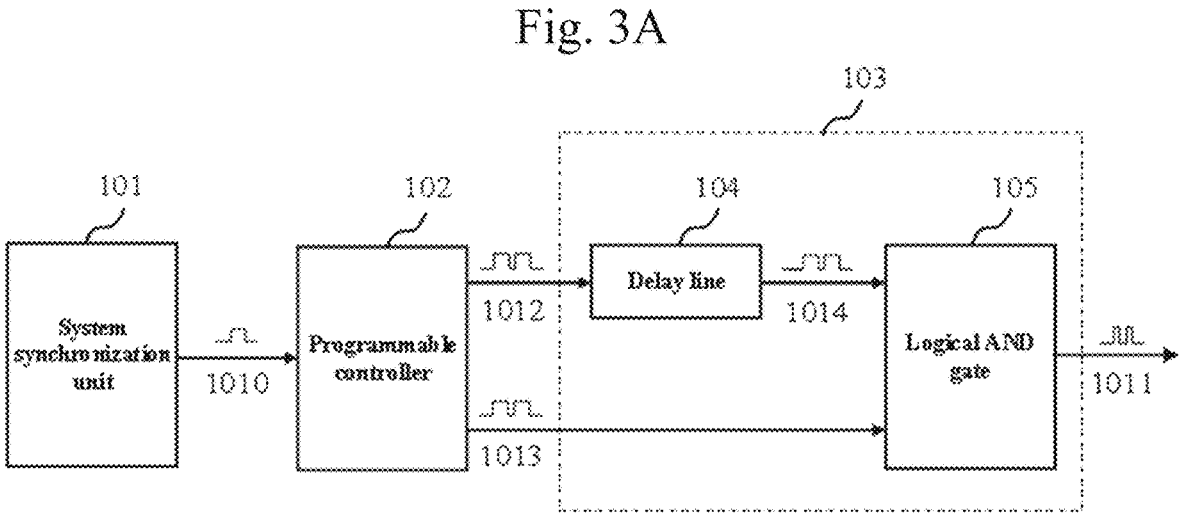
FIG. 3A is a schematic diagram of a narrow-pulse generating unit included in the gating apparatus for the single-photon detector according to an illustrative example of the present disclosure.

Hereinafter, the embodiments of the present disclosure will be described in details with reference to the accompanying drawings.

FIG. 1A is a schematic diagram of a gating apparatus for a single-photon detector according to an illustrative example of the present disclosure. FIG. 1B is a signal timing schematic diagram of an operation process of a gating apparatus for a single-photon detector according to an illustrative example of the present disclosure.

Referring to FIGS. 1A and 1B, the gating apparatus for the single-photon detector according to the illustrative embodiment of the present disclosure may at least include a system synchronization unit 101 and a programmable controller 102 such as, but not limited to, an FPGA.

In the gating apparatus shown in FIG. 1A, the system synchronization unit 101 may be configured to acquire a clock 1010 of a quantum communication system; the programmable controller 102 may be configured to generate at least one periodic gating signal sequence 1011 that are synchronized with the clock (i.e., a clock of an encoded signal of the quantum communication system) of the quantum communication system, wherein gating signals in each gating signal sequence are spaced apart from each other by a predetermined duration $\Delta t_1$, so that a single-photon detector in the quantum communication system turns on gating of the single-photon detector with regard to a received optical pulse (in other words, enabling the single-photon detector in the quantum communication system to operate in a Geiger mode for received optical pulses), wherein the predetermined duration $\Delta t_1$ is an optical path difference between a long arm and a short arm of an unequal-arm interferometer that is used for performing phase encoding in the quantum communication system. This minimizes dark count and after-pulse count in the single-photon detector due to unnecessary repeated gating signals.

In the gating apparatus shown in FIG. 1A, the quantum communication system may be based on time-phase encoding, and may also be based on phase encoding. For example, in a quantum communication system based on time-phase encoding, use of the periodic gating signal sequence 1011 output by the gating apparatus shown in FIG. 1A may enable a single-photon detector to turn on gating of the single-photon detector for an optical pulse carrying time codes received in the quantum communication system, the single-photon detector may also be enabled to turn on gating of the single-photon detector for an optical pulse carrying phase codes received in the quantum communication system, a single-photon detector may also be enabled to turn on gating of the single-photon detector for both an optical pulse carrying time codes and an optical pulse carrying phase codes received in the quantum communication system.

It should be understood that although each gating signal sequence of the periodic gating signal sequence 1011 shown in FIG. 1B includes two gating signals spaced apart from each other by a predetermined duration $\Delta t_1$, the present disclosure is not limited thereto, as required, each gating signal sequence of the periodic gating signal sequence may include more gating signals than the gating signals of each gating signal sequence of the periodic gating signal sequence 1011 as shown in FIG. 1B. In this way, numbers of single-photon detectors and polarization beam splitters used in the quantum communication system can be significantly decreased, cost of the system implementation can been greatly reduced, the insertion loss caused by using additional polarization beam splitters can also be avoided.

FIG. 2 is another schematic diagram of a gating apparatus for a single-photon detector according to an illustrative example of the present disclosure.

Referring to FIG. 2, the gating apparatus shown in FIG. 2 may further include a narrow-pulse generating unit 103 in addition to the system synchronization unit 101 and the programmable controller 102 shown in FIG. 1A, and the narrow-pulse generating unit 103 may be configured to narrow the pulse width of gating signals in the periodic gating signal sequence. In this way, if the pulse width of the gating signal exceeds a system threshold, the pulse width of the gating signal generated by the described gating apparatus can meet the operating requirements of the quantum communication system for single-photon detectors in a Geiger mode.

The implementation of the narrow-pulse generating unit 103 will be described in details below with reference to FIGS. 3A and 3B.

FIG. 3A is a schematic diagram of a narrow-pulse generating unit 103 included in the gating apparatus for the single-photon detector according to an illustrative example of the present disclosure. FIG. 3B is a signal timing schematic diagram of an operation process of a narrow-pulse generating unit 103 included in the gating apparatus for the single-photon detector according to an illustrative example of the present disclosure.

Figure 3B:
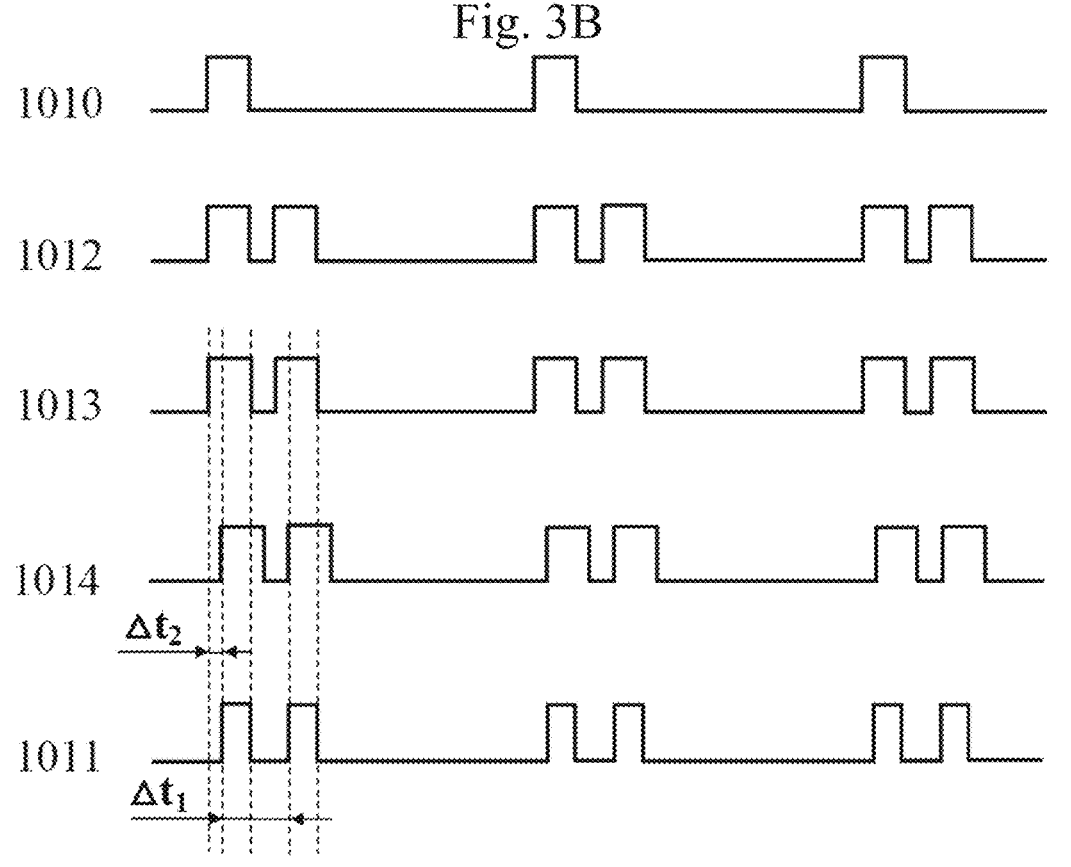
FIG. 3B is a signal timing schematic diagram of an operation process of a narrow-pulse generating unit included in the gating apparatus for the single-photon detector according to an illustrative example of the present disclosure.

Referring to FIGS. 3A and 3B, in the gating apparatus shown in FIG. 3A, the programmable controller 102 may be further configured to generate two identical periodic gating signal sequences 1012 and 1013, and the narrow-pulse generating unit 103 shown in FIG. 3A may include a delay line 104 and a logical AND gate 105.

In the narrow-pulse generating unit 103 shown in FIG. 3A, the delay line 104 can be configured to delay one periodic gating signal sequence 1012 of the two periodic gating signal sequences 1012 and 1013, so that in the two periodic gating signal sequences 1012 and 1013, one periodic gated signal sequence 1012 differs in time from the other periodic gating signal sequence 1013 by a predetermined duration $\Delta t_2$, wherein the predetermined duration $\Delta t_2$ can be smaller than a difference between the predetermined duration $\Delta t_1$ and the pulse width of a gating signal in the periodic gating signal sequences 1012 and 1013; and the logic AND gate 105 can be configured to perform an AND-operation on delayed periodic gating signal sequence 1014 and undelayed periodic gating signal sequence 1013, so as to narrow the pulse width of gating signals in the periodic gating signal sequence.

It should be understood that, although FIG. 3A illustrates a schematic diagram of a narrow-pulse generating unit 103 included in a gating apparatus for a single-photon detector according to an illustrative example of the present disclosure, the present disclosure is not limited thereto, and the narrow-pulse generating unit 103 may be implemented by using other devices or other combinations of devices. The narrow-pulse generating unit 103 may have more or less components than those shown in FIG. 3A.

The implementation of the system synchronization unit 101 will be described in details below with reference to FIGS. 4A and 4B.

Figures 4A, 4B:
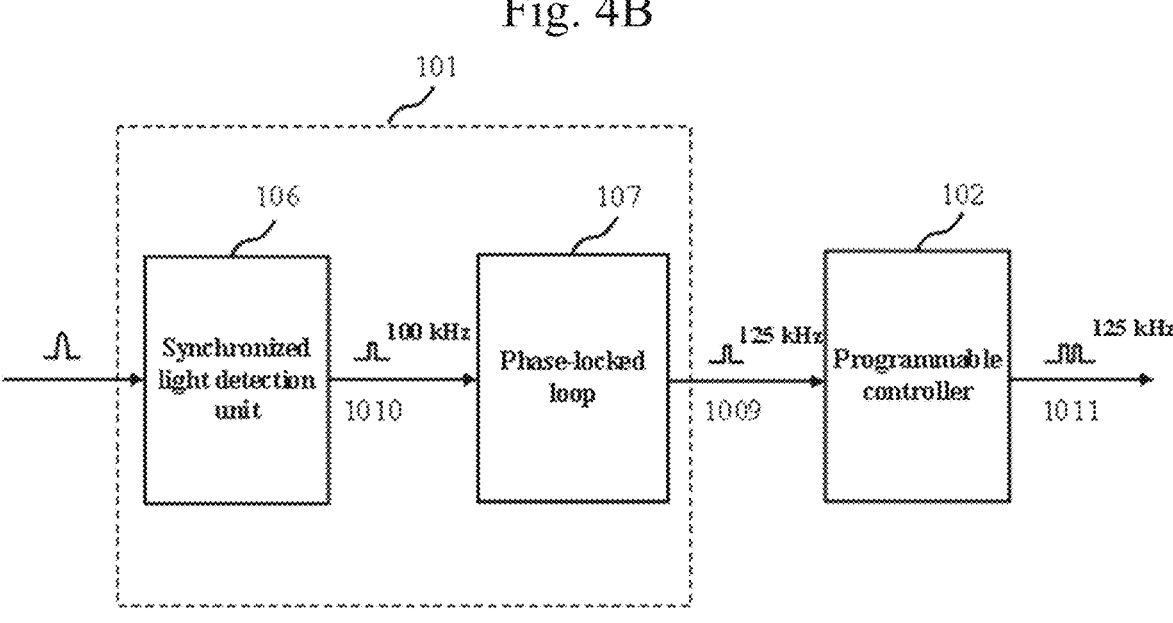
FIG. 4A is a schematic diagram of a system synchronization unit included in the gating apparatus for the single-photon detector according to an illustrative example of the present disclosure.
FIG. 4B is another schematic diagram of a system synchronization unit included in the gating apparatus for the single-photon detector according to an illustrative example of the present disclosure.

FIG. 4A is a schematic diagram of a system synchronization unit 101 included in the gating apparatus for the single-photon detector according to an illustrative example of the present disclosure.

Referring to FIG. 4A, the system synchronization unit 101 included in the gating apparatus for the single-photon detector according to an illustrative example of the present disclosure may include a synchronized light detection unit 106, and the synchronized light detection unit 106 may be configured to convert received synchronized light of the quantum communication system (i.e., synchronized light that is synchronously emitted with optical pulses in an encoded signal) into a synchronized electrical signal, to acquire the clock 1010 of the quantum communication system. In cases where the programmable controller 102 can perform phase locking and frequency doubling on the signal, the programmable controller 102 may be further configured to perform phase locking and frequency doubling on the synchronized signal to produce the periodic gating signal sequence 1011 that is synchronized with the clock 1010 of the quantum communication system. For example, in a case where the synchronized light is light of low frequency, the system synchronization unit 101 illustrated in FIG. 4A can convert, for example but not limited to the clock 1010 having a frequency of 100 KHz into, for example but not limited to the periodic gating signal sequence 1011 having a frequency of 125 kHz, so that the low-frequency signal is converted into a high-frequency signal.

FIG. 4B is another schematic diagram of a system synchronization unit 101 included in the gating apparatus for the single-photon detector according to an illustrative example of the present disclosure.

Referring to FIG. 4B, in addition to the synchronized light detection unit 106 shown in FIG. 4A, the system synchronization unit 101 included in the gating apparatus for the single-photon detector according to an illustrative example of the present disclosure may further include a phase-locked loop 107, configured to perform phase locking and frequency doubling on the synchronized signal, so as to generate a periodic gating signal 1009 synchronized with the clock 1010 of the quantum communication system. In cases where the programmable controller 102 cannot perform phase locking and frequency doubling on the signal, the programmable controller 102 may be further configured to generate, on the basis of the periodic gating signal 1009, a periodic gating signal sequence 1011 that is synchronized with the clock 1010 of the quantum communication system. For example, in cases where the synchronized light is light of low frequency, the system synchronization unit 101 illustrated in FIG. 4B can convert, for example but not limited to a clock 1010 having a frequency of 100 kHz into, for example but not limited to a clock 1009 having a frequency of 125 kHz, so that the low-frequency signal is converted into a high-frequency signal.

It should be understood that although FIGS. 4A and 4B illustrates a schematic diagram of the system synchronization unit 101 included in the gating apparatus for the single-photon detector according to an illustrative example of the present disclosure, the present disclosure is not limited thereto, and the system synchronization unit 101 may also be implemented by using other devices or other combinations of devices. The number of components in the system synchronization unit 101 may be more than or less than those shown in FIGS. 4A and 4B.

Figure 5A:
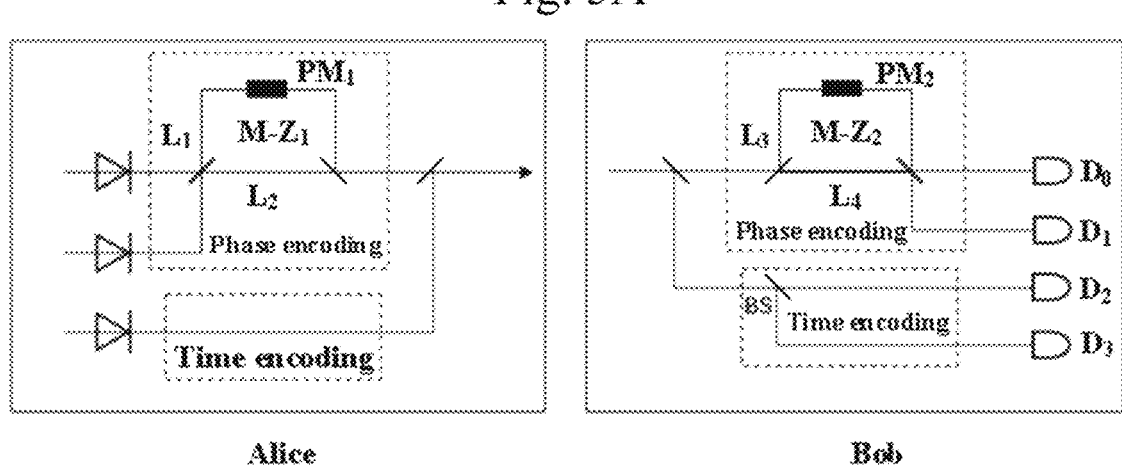
FIG. 5A is a schematic diagram of a quantum communication system based on time-phase encoding in the related art.

FIG. 5A is a schematic diagram of a quantum communication system based on time-phase encoding in the related art.

Referring to FIG. 5A, in the related art, a quantum communication system based on time-phase encoding may include an Alice end and a Bob end. In the quantum communication system shown in FIG. 5A, optical pulses emitted from the Alice end can reach one of single-photon detectors $D_0$, $D_1$, $D_2$ and $D_3$ of the Bob end, wherein no light interference phenomenon occurs to optical pulses arriving at the Bob end by means of paths ($L_2$, $L_4$) and ($L_1$, $L_3$) provided by unequal-arm interferometers M-$Z_1$ and M-$Z_2$, and light phenomena occur to optical pulses arriving at the Bob end by means of paths ($L_1$, $L_4$) and ($L_2$, $L_3$) provided by unequal-arm interferometers M-$Z_1$ and M-$Z_2$. The Alice end and the Bob end may modulate the phases of the phase modulators $PM_1$ and $PM_2$, so that the intensities of the optical pulses to which interference occur vary with different phase differences, thereby implementing phase encoding. In addition, the Alice end and the Bob end may also perform time adjustment on the optical pulse, thereby implementing time encoding.

Figure 5B:
FIG. 5B is a schematic diagram of applying a gating signal to the single-photon detectors in the quantum communication system shown in FIG. 5A for detecting time codes carried by an optical pulse in the related art.

In the related art, optical pulses carrying phase codes may be randomly distributed into one of the single-photon detectors $D_0$ and $D_1$ in the Bob end for detection, and optical pulses carrying time codes may be randomly distributed into one of the single-photon detectors $D_2$ and $D_3$ in the Bob end for detection. For example, FIG. 5B is a schematic diagram of applying a gating signal to the single-photon detectors $D_2$ and $D_3$ in the quantum communication system shown in FIG. 5A for detecting time codes carried by a optical pulse in the related art.

Figure 6A:
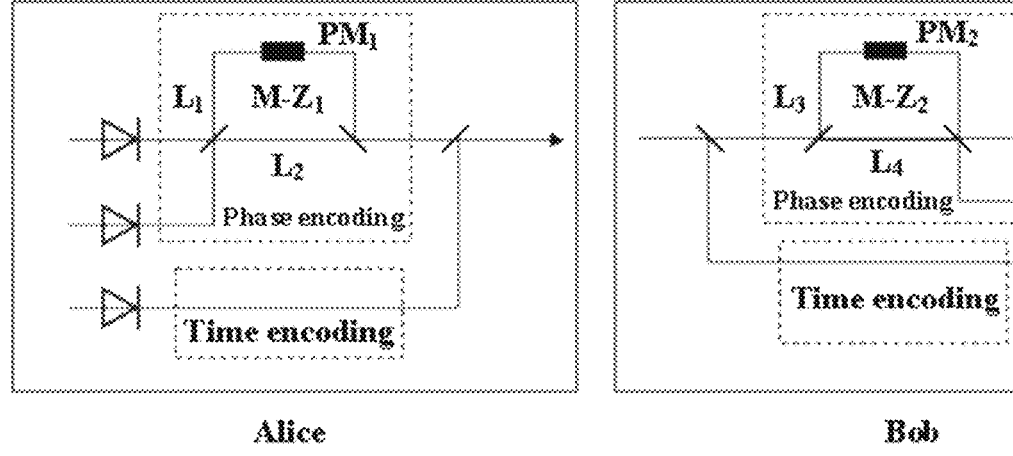
FIG. 6A is a schematic diagram of a quantum communication system based on time-phase encoding according to an illustrative example of the present disclosure.

FIG. 6A is a schematic diagram of a quantum communication system based on time-phase encoding according to an illustrative example of the present disclosure.

Referring to FIG. 6A, the quantum communication system based on time-phase encoding illustrated in FIG. 6A may include an Alice end and a Bob end. In the quantum communication system shown in FIG. 6A, optical pulses emitted from the Alice end can reach one of single-photon detectors $D_0$, $D_1$ and $D_2$ of the Bob end, wherein no light interference phenomenon occurs to optical pulses arriving at the Bob end by means of paths ($L_2$, $L_4$) and ($L_1$, $L_3$) provided by unequal-arm interferometers M-$Z_1$ and M-$Z_2$, and light phenomena occur to optical pulses arriving at the Bob end by means of paths ($L_1$, $L_4$) and ($L_2$, $L_3$) provided by unequal-arm interferometers M-$Z_1$ and M-$Z_2$. The Alice end and the Bob end may modulate the phases of the phase modulators $PM_1$ and $PM_2$, so that the intensities of the optical pulses to which interference occur vary with different phase differences, thereby implementing phase encoding. In addition, the Alice end and the Bob end may also perform time adjustment on the optical pulse, thereby implementing time encoding.

In the quantum communication system shown in FIG. 6A, the optical pulses carrying phase codes may be randomly distributed to one of single-photon detectors $D_0$ and $D_1$ on the Bob end for detection, and the optical pulses carrying time codes may be directly distributed to a single single-photon detector $D_2$ on the Bob end for detection. For example, FIG. 6B is a schematic diagram of applying a gating signal to the single-photon detector in the quantum communication system shown in FIG. 6A by using the gating apparatus 100 for the single-photon according to an illustrative example of the present disclosure for detecting time codes carried by an optical pulse.

It can be determined that, compared with the quantum communication system shown in FIG. 5A, by using the gating apparatus 100 for the single-photon detector according to an illustrative example of the present disclosure, the quantum communication system shown in FIG. 6A uses only a single single-photon detector $D_2$ to detect time codes carried by the optical pulses, so that the number of single-photon detectors used in the quantum communication system can be reduced, the implementation cost of the system is reduced, and the insertion loss caused by using the polarization beam splitter BS as shown in FIG. 5A can also be avoided, wherein the insertion loss is usually about 3 dB.

Figure 6B:
FIG. 6B is a schematic diagram of applying a gating signal to the single-photon detector in the quantum communication system shown in FIG. 6A by using the gating apparatus for the single-photon according to an illustrative example of the present disclosure for detecting time codes carried by an optical pulse.

It should be understood that, although FIGS. 6A and 6B each show an example in which the gating apparatus 100 for a single-photon detector according to an illustrative example of the present disclosure detects time codes carried by the optical pulses by means of a single single-photon detector $D_2$, this example is merely illustrative, and the present disclosure is not limited thereto. For example, as required, the gating apparatus 100 for the single-photon detector according to an illustrative example of the present disclosure may also be used to detect phase codes carried by the optical pulses by means of the single single-photon detector, and even more, the gating apparatus 100 for the single-photon detector according to an illustrative example of the present disclosure may also be used to detect phase codes and time codes carried by the optical pulses by means of the single single-photon detector. Accordingly, as required, each of the periodic gating signal sequence 1011 outputted by the gating apparatus 100 for the single-photon detector according to an illustrative example of the present disclosure may include, but is not limited to, more than two gating signals.

Figure 7:
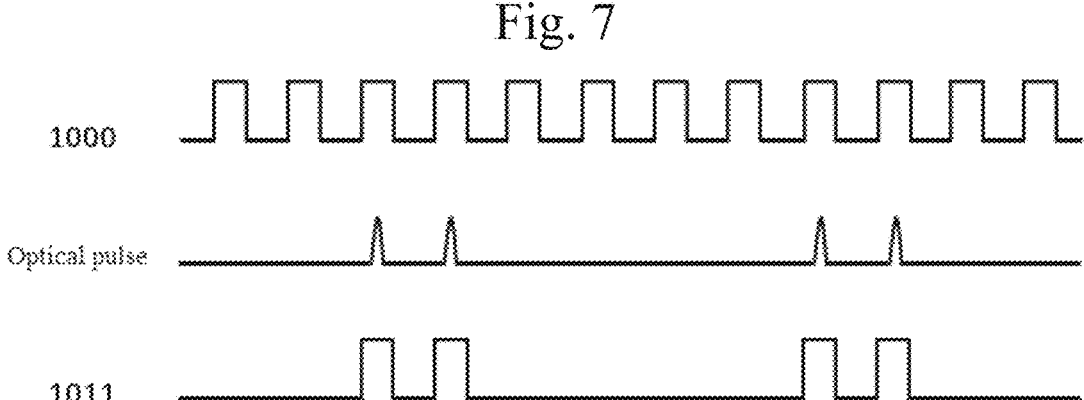
FIG. 7 is a schematic diagram of a comparison between a periodic gating signal that is output in the related art and a periodic gating signal sequence that is output by the gating apparatus for the single-photon detector according to an illustrative example of the present disclosure.

FIG. 7 is a schematic diagram of a comparison between a periodic gating signal that is output in the related art and a periodic gating signal sequence 1011 that is output by the gating apparatus 100 for the single-photon detector according to an illustrative example of the present disclosure.

It can be determined that, compared with the periodic gating signal 1000 outputted by using the related art, the periodic gating signal sequence 1011 outputted by the gating apparatus 100 for the single-photon detector according to an illustrative example of the present disclosure has a lower repetition frequency, which can reduce dark count and after-pulse count caused by high repetition frequency during the operation of the single-photon detector in quantum communication system at a high frequency, thereby greatly reducing the error rate of quantum communication system during the coding process to a great extent.

Accordingly, the present disclosure further provides a quantum communication device (such as a Bob end shown in FIG. 6A) comprising the gating apparatus for the single-photon detector, so as to reduce dark count and after-pulse count caused by the use of periodic gated signals at a high repetition frequency during the operation of the single-photon detector in quantum communication system at a high frequency, thereby greatly reducing the error rate of quantum communication system during the coding process to a great extent, in addition, it significantly reduces the number of single-photon detectors and polarization beam splitters used in the quantum communication system to greatly reduce the implementation cost of the system, and also reduces the insertion loss caused by using additional polarization beam splitters (BS) (as shown in FIG. 5A).

Although the present disclosure has been shown and described with reference to the preferred embodiments, those skilled in the art should understand that various modifications and changes may be made to these embodiments without departing from the spirit and scope of the present disclosure defined by the claims.

What is claimed is:

1. A gating apparatus for a single-photon detector, comprising:

a system synchronization unit, configured to acquire a clock of a quantum communication system; and a programmable controller, configured to generate a periodic gating signal sequence that is synchronized with the clock of the quantum communication system, wherein each gating signal sequence in the periodic gating signal sequence includes at least two gating signals, and the gating signals in the each gating signal sequence are spaced apart from each other by a predetermined duration, so that a single-photon detector in the quantum communication system turns on gating of the single-photon detector with regard to a received optical pulse, wherein the predetermined duration is an optical path difference between a long arm and a short arm of an unequal-arm interferometer that is used for performing phase encoding in the quantum communication system;

wherein the system synchronization unit comprises: a synchronized light detection unit, configured to convert received synchronized light of the quantum communication system into a synchronized signal, so as to acquire the clock of the quantum communication system;

wherein the programmable controller is further configured to perform phase locking and frequency doubling on the synchronized signal, so as to generate the periodic gating signal sequence synchronized with the clock of the quantum communication system; or, the system synchronization unit further comprises: a phase-locked loop, configured to perform phase locking and frequency doubling on the synchronized signal, so as to generate a periodic gating signal synchronized with the clock of the quantum communication system.

2. The gating apparatus according to claim 1, wherein the quantum communication system is based on time-phase encoding or based on phase encoding.

3. The gating apparatus according to claim 1, wherein the gating apparatus further comprises:

a narrow-pulse generating unit, configured to narrow a pulse width of gating signals in the periodic gating signal sequence.

4. The gating apparatus according to claim 3, wherein the programmable controller is further configured to generate two identical periodic gating signal sequences.

5. The gating apparatus according to claim 4, wherein the narrow-pulse generating unit comprises:

a delay line, configured to delay one of the two identical periodic gating signal sequences, so that in the two identical periodic gating signal sequences, one periodic gated signal sequence differs in time from the other periodic gating signal sequence by another predetermined duration, wherein the another predetermined duration is smaller than a difference between the predetermined duration and the pulse width of a gating signal in the periodic gating signal sequence; and a logic AND gate, configured to perform an AND-operation on delayed periodic gating signal sequence and undelayed periodic gating signal sequence, so as to narrow the pulse width of the gating signals in the periodic gating signal sequence.

6. The gating apparatus according to claim 1, wherein in a case where the system synchronization unit comprises the phase-locked loop, the programmable controller is further configured to generate the periodic gating signal sequence synchronized with the clock of the quantum communication system on the basis of the periodic gating signal.

7. The gating apparatus according to claim 1, wherein the clock of the quantum communication system comprises a clock of an encoded signal of the quantum communication system.

* * * * *